United States Patent [19]

Schlunke et al.

[11] Patent Number: 4,932,536
[45] Date of Patent: Jun. 12, 1990

[54] MAGAZINE FOR CALENDER ROLLS

[75] Inventors: Jürgen Schlunke, Krefeld; Dieter Junk, Kreuztal, both of Fed. Rep. of Germany

[73] Assignee: Kleinewefers GmbH, Krefeld, Fed. Rep. of Germany

[21] Appl. No.: 272,096

[22] Filed: Nov. 16, 1988

[30] Foreign Application Priority Data

Nov. 17, 1987 [DE] Fed. Rep. of Germany ....... 3738974

[51] Int. Cl.⁵ .............................................. A47F 3/08
[52] U.S. Cl. ...................................... 211/1.5; 211/164
[58] Field of Search .................... 211/1.5, 44, 164, 121

[56] References Cited

U.S. PATENT DOCUMENTS

| 141,064 | 7/1873 | McMahon | 211/164 |
| 865,032 | 9/1907 | Greenawalt | 211/1.5 X |
| 986,433 | 3/1911 | Briody | 211/44 X |
| 1,281,105 | 10/1918 | Unger | 211/164 |
| 1,501,633 | 7/1924 | Tyler | 211/164 |
| 2,954,684 | 10/1960 | Stillman | 211/164 X |
| 3,674,155 | 7/1972 | Kessler | 211/164 X |

Primary Examiner—Alvin C. Chin-Shue
Assistant Examiner—Sarah A. Lechok
Attorney, Agent, or Firm—Peter K. Kontler

[57] ABSTRACT

A magazine for temporary storage of elastic supercalender rolls has a frame for a rotor which can be driven to rotate about a horizontal axis and has two axially spaced-apart sections each carrying a set of equidistant cradles for the end portions of rolls. Each cradle has a socket for the end portion of a roll, and the cradles are maintained in such orientation that the open sides of their sockets face upwardly while the rotor turns about the horizontal axis and the cradles orbit about such axis. A stationary inflatable tire is mounted in the frame to rotate the rolls about their respective axes while the rotor is caused to rotate about the horizontal axis.

11 Claims, 1 Drawing Sheet

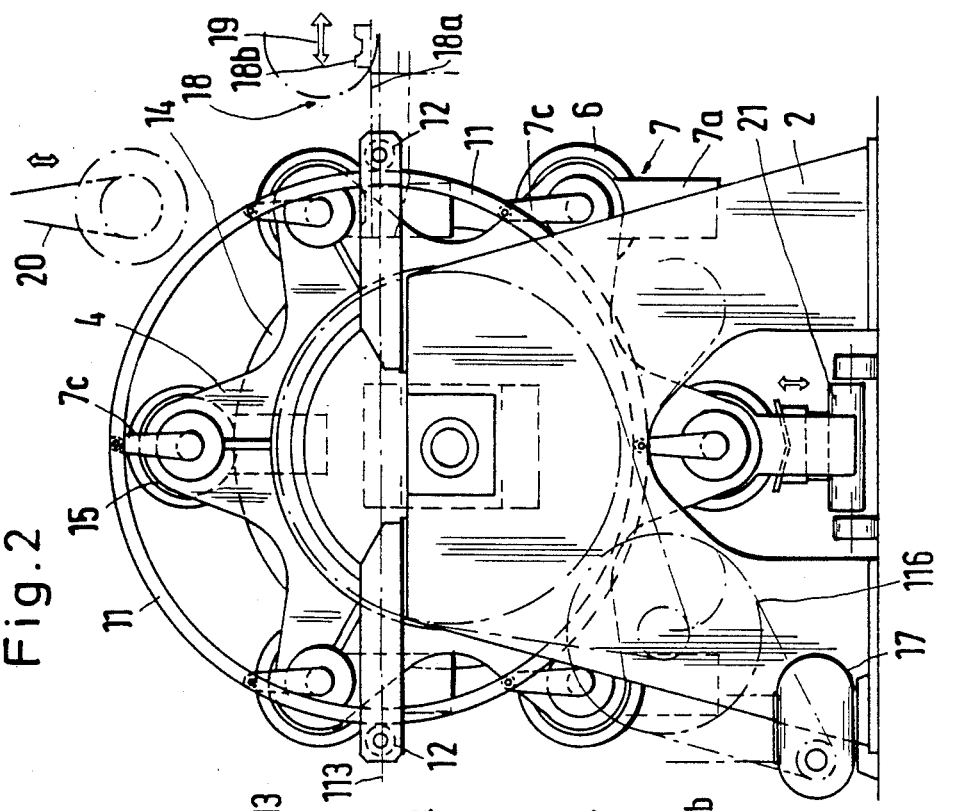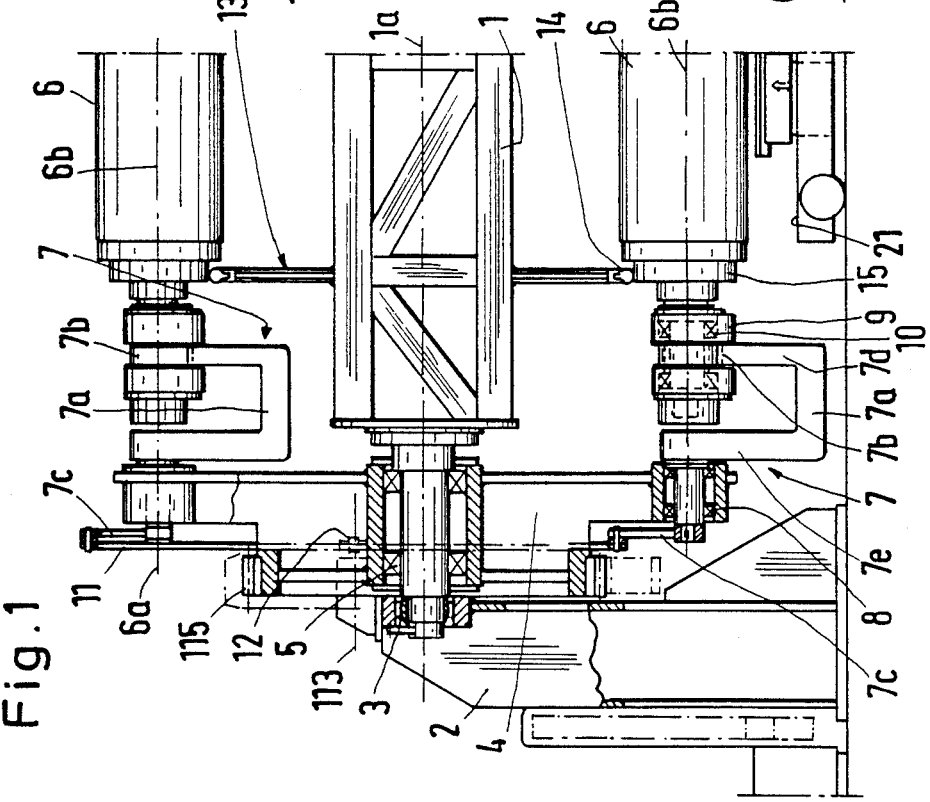

MAGAZINE FOR CALENDER ROLLS

BACKGROUND OF THE INVENTION

The invention relates to improvements in magazines in general, and more particularly to magazines for calender rolls, especially to magazines for so-called elastic rolls which are used in supercalenders in conjunction with hard rolls to define nips for the treatment of paper webs or the like.

It is already known to place a rack next to a supercalender and to use the rack as a depository for temporary storage of elastic rolls which are about to be inserted into the supercalender or which were removed from the supercalender for the purposes of inspection, replacement or repair. Rolls which are temporarily stored in such racks are called elastic rolls because they have elastic layers adjacent their peripheral surfaces. The rack comprises two spaced-apart frame members and arms which are disposed between the frame members at several levels and serve to support discrete elastic rolls. As a rule, the arms are designed to support rolls together with bearings for the end portions of the respective rolls.

The rack is further provided with friction wheels which are mounted on discrete lever arms and are driven by a common prime mover to rotate the temporarily stored elastic rolls. Such rotation of elastic rolls is desirable in order to prevent the formation of a so-called moisture bag at the lowermost point of a stationary (non-rotating) elastic roll.

A drawback of the just described racks is that their cost is very high, especially in view of the need for several friction wheels, one for each roll-supporting arm. Moreover, such racks cannot be readily approached by a crane or a floor conveyor, i.e., by conventional devices which are used to transport elastic rolls between a supercalender and a magazine for elastic rolls.

German Auslegeschrift No. 1 281 943 of Gais discloses a magazine for cylindrical objects wherein two endless chains carry aligned sockets for reception of stubs at the axial ends of cylindrical objects. A drawback of such magazines is that they occupy too much floor space or that they extend to a level well above the floor. In addition, the magazines comprise a very large number of parts.

German Auslegeschrift No. 2 017 754 of Blechinger discloses a similar magazine which is used for storage of cores for bobbins and which also comprises two endless chains. This magazine exhibits the drawbacks of the aforediscussed magazine of Gais. A further drawback which is common to magazines wherein objects are temporarily stored while being supported by chains is that the magazines must be equipped with extremely strong and hence bulky and expensive chains or that the dimensions and strength of the chains impose limits upon the weight of objects which can be supported thereon.

German Utility Model No. 1 812 780 to Ateliers de Construction de Vanves H. Dumenil discloses a motor-driven rotor for orbitable receptacles in the form of boxes. The receptacles serve for more or less permanent storage of cards, slips of paper or the like. This magazine is incapable of supporting any objects the combined bulk and/or weight of which even remotely approach that of a single calender roll. Moreover, the magazine is devoid of any means for rotating the receptacles since this would cause the stored cards or sheets to leave the respective receptacles.

OBJECTS OF THE INVENTION

An object of the invention is to provide a simple, compact and relatively inexpensive magazine which can store a substantial number of calender rolls in a small area, which can be placed into close or immediate proximity to a calender, and wherein the temporarily stored calender rolls are close to the floor level.

Another object of the invention is to provide novel and improved carriers for the end portions of calender rolls.

A further object of the invention is to provide novel and improved means for rotating the temporarily stored calender rolls about their respective axes.

An additional object of the invention is to provide a magazine which can receive rolls from, or which can be relieved of rolls by, presently known apparatus including cranes, floor conveyors and the like.

Still another object of the invention is to provide the magazine with novel and improved means for ensuring that the carriers for the end portions of temporarily stored calender rolls are invariably maintained in an optimum orientation to permit convenient insertion or removal of the end portions of rolls.

A further object of the invention is to provide a magazine which can be used for storage of lightweight, medium heavy as well as heaviest calender rolls.

Another object of the invention is to provide a novel and improved combination of a rotor and carriers for calender rolls which can be used in the above outlined magazine.

SUMMARY OF THE INVENTION

The invention is embodied in a magazine which is designed for temporary storage of calender rolls, especially elastic rolls of the type used in supercalenders. The improved magazine comprises a frame, and a rotor which is mounted in the frame and has means for supporting a plurality of calender rolls. The rotor is mounted in the frame for rotation about a predetermined axis (preferably about a horizontal or nearly horizontal axis), and the supporting means includes a plurality of supports for discrete calender rolls. The supports are arranged to orbit about the predetermined axis in response to rotation of the rotor.

In accordance with a presently preferred embodiment, the rotor includes two sections which are spaced apart from each other in the direction of the predetermined axis, and each support includes a first carrier provided on or in one of the rotor sections and serving to support one end portion of a roll, and a second carrier which is provided on the other rotor section and serves to support the other end portion of a roll. Each first carrier is aligned with the respective second carrier. The first and second carriers are equidistant from each other in the circumferential direction of the respective rotor section, and the magazine preferably further comprises common drive means for rotating the sections about the predetermined axis as a unit.

Each carrier preferably includes or constitutes a substantially U-shaped cradle having a first leg which is mounted in or on the respective rotor section for rotation about a second axis extending in parallelism with the predetermined axis, and a second leg having a preferably bifurcated socket for one end portion of a roll.

The open sides of the sockets face upwardly to facilitate insertion or removal of end portions of calender rolls. The second axes coincide with the axes of calender rolls which are supported by the sockets of the respective cradles.

The magazine preferably further comprises guide means for preventing changes of orientation of the cradles while the rotor turns about the predetermined axis; this ensures that the open sides of the sockets face upwardly while the cradles orbit about the predetermined axis. The guide means can comprise annular guides which are adjacent the rotor sections, and followers provided on the cradles and tracking the respective annular guides. Each follower can include a lever which is preferably coplanar with the legs of the respective cradle, and the annular guides are disposed in planes extending at right angles to the predetermined axis. The frame of such magazine is provided with or carries stops (e.g., with two stops per annular guide) which serve to maintain the annular guides in predetermined positions, namely in positions such that the guides are offset from the predetermined axis by distances corresponding to the effective length of a lever. If the predetermined axis is horizontal, the axes of the annular guides are disposed at a level above the predetermined axis.

The end portions of a properly inserted calender roll are rotatable in the sockets of the respective cradles, and the magazine preferably further comprises means for rotating the rolls which are supported by the cradles so that the rolls turn about the respective second axes in response to rotation of the rotor relative to the frame. Such means for rotating preferably includes at least one stationary friction wheel which is provided in or on the frame and engages each roll which is supported by a pair of cradles. The friction wheel can include or constitute an inflatable and deflatable tire. In accordance with a presently preferred embodiment, the friction wheel includes two or more sections which follow each other in the circumferential direction of the friction wheel and are inflatable and deflatable independently of each other.

The novel features which are considered as characteristic of the invention are set forth in particular in the appended claims. The improved magazine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary partly side elevational and partly vertical sectional view of a magazine which embodies the present invention and has six pairs of cradles for discrete calender rolls; and FIG. 2 is an end elevational view of the magazine as seen from the left-hand side of FIG. 1, a portion of a crane and a portion of a roll exchanging apparatus which can be used to deliver calender rolls to or to remove calender rolls from the magazine being indicated by phantom lines.

DESCRIPTION OF PREFERRED EMBODIMENTS

FIG. 1 shows one-half of the improved magazine. The other half is substantially a mirror image of the illustrated half. The magazine comprises a stationary frame including an elongated horizontal non-rotatable frame member 1 and two upright end walls 2 supporting the end portions of the frame member 1 through the medium of spherical bearings 3. The frame member 1 supports a rotor including two star-shaped sections 4 which are spaced apart from one another in the direction of their common horizontal axis 1a. The sections 4 of the rotor are inwardly adjacent the respective end walls 2 and are rotatably mounted on the corresponding end portions of the frame member by means of antifriction bearings 5.

Each section 4 of the two-piece rotor is provided with six equidistant carriers 7 in the form of substantially U-shaped cradles having sockets 7b for end portions 9 of elastic calender rolls 6. Each carrier or cradle 7 on one of the rotor sections 4 is aligned with a carrier or cradle on the other rotor section and forms therewith a two-piece support for a roll 6. The illustrated rotor section 4 is provided with six equidistant cradles 7. The arrangement is such that each radially outwardly extending prong of the star-shaped rotor section 4 supports a discrete cradle 7.

Each cradle 7 comprises a web 7a and two upwardly extending legs 7d, 7e. The leg 7d is provided with the aforementioned socket 7b which has an open upper side for convenient insertion or withdrawal of the end portion 9 of a calender roll 6. The socket 7b can be said to constitute a bifurcated portion of the respective leg 7d. The leg 7e carries a stud which is journalled in an antifriction bearing 8 of the rotor section 4. The axis 6a around which the stud of the leg 7e can turn relative to the section 4 is parallel to the axis 1a and coincides with the axis 6b of the roll 6 which is supported by the corresponding cradle 7 as well as by the aligned cradle on the other rotor section 4.

The configuration of the end portions 9 of rolls 6 is preferably such that they fill the corresponding sockets 7b. Those parts of the end portions 9 which are received in the sockets 7b contain antifriction bearings 10 for the stubs of the rolls 6. Such rolls can be used in a supercalender, not shown, for example, in a supercalender of the type shown in FIGS. 1 and 2 of the commonly owned copending U.S. patent application Ser. No. 272,114 filed Nov. 16, 1988 by Jürgen Schlunke et al. for "Apparatus for exchanging rolls in calenders".

Since the axis 6b of a properly supported roll 6 coincides with the axes 6a of rotation of the corresponding cradles 7 in the rotor sections 4, forces which are attributable to the weight of the roll 6 and/or to rotation of the roll 6 about its own axis 6b and/or to acceleration of the roll when the rotor sections 4 are caused to turn about their common axis 1a cannot tend to move the roll away from the circular path along which the roll orbits in response to turning of the rotor. In other words, the distance of the axis 6b of a properly mounted roll 6 from the axis 1a remains unchanged. However, the cradles 7 are subjected to the action of relatively small turning moments which develop when the rotor sections 4 start or cease to turn about the axis 1a and as a result of moments of friction generated by the bearings 8 and 10. The means for preventing changes of orientation of the cradles 7 under the action of the aforediscussed turning moments, and for thus ensuring that the open sides of the sockets 7b invariably face upwardly, comprises two annular guides 11, each adjacent one of the rotor sections 4, and followers 7c in the form of levers which are rigid with the stubs on the legs 7e of the respective cradles 7 and track the adjacent annular guides 11. In addition to the provision of annular guides 11 and levers 7c, the tendency of cradles 7 to change their orientation can be counteracted by appropriate selection of the center of gravity of each cradle. Each lever 7c is coplanar with the legs 7d, 7e of the corresponding cradle 7, and the effective length of such lever determines the extent to which the axes 113 of the annular guides 11 are offset from the axis 1a of the rotor sections 4. The levers 7c cooperate with the corresponding annular guides 11 to ensure that all cradles 7 invariably remain in vertical planes with the legs 7d, 7e extending downwardly from the respective axes 6a. The annular guides 11 are disposed at the outer sides of the respective rotor sections 4 and are maintained in optimum positions by pairs of stops 12 (e.g., in the form of rollers) which are mounted in the frame, namely on the adjacent end walls 2. The annular guides 11 are disposed in planes which are normal to the axis 1a, and the levers 7c are rigid with the respective legs 7e. The pairs of rollers 12 prevent lateral movements of the annular guides 11, i.e., movements to the left or to the right as seen in FIG. 2. Since the levers 7c extend upwardly from the corresponding legs 7e, the axes 113 of the annular guides 11 are disposed at a level above the axis 1a of the rotor including the sections 4.

The magazine further comprises means 13 for rotating the roll or rolls 6 about their respective axes 6b in response to turning of the rotor sections 4. Such rotating means 13 comprises one or more friction wheels in the form of inflatable and deflatable tires 14 mounted on the frame member 1 and engageable with smaller-diameter portions 15 of the rolls 6 in the magazine. The tire 14 is deflated prior to introduction of a roll 6 into the magazine and is thereupon inflated so that its diameter increases, i.e., the inflated tire 14 then engages the portions 15 of all properly supported rolls 6. The difference between the diameters of the inflated and deflated tire 14 must be properly related to the depth of the sockets 7b in the legs 7d of cradles 7.

It is preferred to subdivide the tire 14 into two or more sections (as seen in the circumferential direction of the tire) which can be inflated and deflated independently of each other. This entails savings in time for inflation or deflation of that section of the tire 14 which must be deflated prior to mounting of a roll 6 in a pair of cradles 7 and which must be reinflated once the end portions 9 of such roll are properly received in the corresponding sockets 7b. In addition, subdivision of the tire 14 into two or more arcuate sections ensures that the inflation of a selected section does not involve the consumption of large quantities of compressed air. Still further, the sections of the tire 14 can be independent of each other so that a damaged section of the tire can be replaced while the remaining section or sections of the tire remain on the frame member 1. For example, the tire 14 can be assembled of two discrete arcuate sections each of which extends along an arc of approximately 180°. The exact construction of the means for inflating two or more sections of the tire 14, and for permitting escape of air from such sections, forms no part of the present invention. For example, each section of the tire 14 can be provided with a valve of the type used on the tires of motor vehicles, and compressed air can be supplied by a compressor of the type used in gasoline stations.

The means for rotating the sections 4 of the rotor about the axis 1a comprises an electric motor 17 or another suitable prime mover and a chain transmission 116 including a sprocket wheel 115 on the illustrated rotor section 4. The other rotor section 4 preferably receives torque from the illustrated section 4. The arrangement is preferably such that the rotor is driven at a relatively low RPM. A second motor 17 and a second chain transmission 116 can be provided if it is desired to positively drive each of the two rotor sections 4. The magazine is then equipped with means for synchronizing the rotary movements of the rotor sections. The illustrated chain transmission 116 can be replaced with a worm gear or spur gear transmission or any other suitable transmission without departing from the spirit of the invention. When the motor 17 is on and the rotor sections 4 turn about the axis 1a, portions 15 of the rolls 6 which are installed in the magazine roll along the inflated tire 14 (which is non-rotatably mounted on the frame member 1) so that the rolls 6 are compelled to turn about their respective axes 6b. This eliminates the development of aforementioned moisture bags when the rolls 6 are elastic rolls of the type used in supercalenders. The tire 14 can be said to constitute the sun gear and the roll portions 15 can be said to constitute the pinions of a planetary which serves to turn the rolls 6 about their axes 6b in response to rotation of the rotor sections 4 about the axis 1a. The sections 4 are preferably driven at a low RPM whenever the magazine supports at least one roll 6; such rotary movement of the sections 4 is interrupted only when a roll 6 is to be mounted in or a, roll is to be removed from the magazine. The arrangement is preferably such that the rotor sections 4 can be arrested in a total of twelve angular positions which are spaced apart by distances corresponding to half the distance between two neighboring axes 6a.

A roll can be delivered to or removed from the magazine by a floor conveyor 21 having a platform which is movable up and down as indicated by a double-headed arrow to accept an elastic roll 6 which is held at the six o'clock position of the rotor including the sections 4 or to deliver a roll to the cradles 7 at the six-o'clock position of the rotor.

FIG. 2 further shows a portion of a conventional crane 20 which can be used to deliver elastic rolls 6 to, or to remove elastic rolls from, the improved magazine.

Still further, FIG. 2 shows a portion of a roll exchanging apparatus of the type disclosed in the aforementioned copending U.S. patent application Ser. No. 272,114 of Jürgen Schlunke et al. This apparatus comprises two tracks 18 each of which has two or more guides 18a which are slidably telescoped into each other and one of which mounts a reciprocable support 18b for one end portion of a roll 6. The guide or guides 18a and the support 18b are reciprocable in directions which are indicated by a double-headed arrow 19 in order to transfer a roll 6 between the magazine and a supercalender. The tracks 18 are mounted on a vertically movable platform and can be reciprocated along horizontal paths.

An important advantage of the improved magazine with a depository in the form of a rotor is that the rolls can be delivered to or removed from the rotor at any one of a number of desired positions, e.g., at the six o'clock position if the means for delivering or accepting rolls is a floor conveyor 21, at or close to the two o'clock position if the means for delivering or accepting rolls includes the aforediscussed platform and tracks 18, or at or close to the twelve o'clock position if the means for delivering or accepting rolls is a crane 20. Such versatility is due to the fact that the rotor including the sections 4 can deliver a roll 6 or a pair of unoccupied cradles 7 to any desired position. The magazine can be placed adjacent a wall or adjacent a machine in the plant because it suffices to ensure access to a relatively small portion of the rotor, e.g., only to the portion which is immediately adjacent the floor if the rolls 6 are to be delivered or accepted by the conveyor 21. Such accessibility of the magazine greatly reduces its space requirements or permits the storage of a large number of rolls 6 without unduly increasing the diameters of the rotor sections 4.

While it is possible to replace the twin-section rotor with a paternoster type depository for rolls, the illustrated depository with two rotor sections 4 which can be indexed or rotated about a common axis 1a is preferred at this time because this contributes to simplicity, lower cost and compactness of the magazine. Moreover, such design of the depository renders it possible to maintain the desired orientation of the cradles 7 in a very simple and inexpensive but reliable manner. The desired orientation can be ensured regardless of whether or not the two relatively simple star-shaped sections 4 of the rotor are rigidly connected to each other.

The cradles 7 can be provided with suitable means for temporarily locking the end portions 9 of the rolls 6 in their sockets 7b. However, it has been found that substantially fork-shaped sockets 7b suffice to ensure reliable retention of the end portions 9, especially in view of the provision of aforementioned annular guides 11 and levers or followers 7c which ensure that the orientation of cradles 7 remains unchanged while the cradles orbit about the axis 1a of the rotor when the motor 17 is on.

The provision of a friction wheel in the from of an inflatable and deflatable tire 14 is particularly advantageous if the means for delivering and accepting rolls (or one of such delivering and accepting means) is the floor conveyor 21.

Without further analysis, the foregoing will so fully reveal the gist of the present invention that others can, by applying current knowledge, readily adapt it for various applications without omitting features that, from the standpoint of prior art fairly constitute essential characteristics of the generic and specific aspects of our contribution to the art and, therefore, such adaptations should and are intended to be comprehended within the meaning and range of equivalence of the appended claims.

We claim:

1. A magazine for temporary storage of calender rolls of the type having first and second end portions, comprising a frame; and a rotor in said frame, said rotor being mounted in said frame for rotation about a substantially horizontal axis and having means for supporting a plurality of calender rolls, said supporting means including a plurality of supports for discrete calender rolls and said supports being arranged to orbit about said axis in response to rotation of said rotor, said rotor including two sections which are spaced apart from each other in the direction of said axis and each of said supports including a first carrier provided on one of said sections and arranged to carry one end portion of a roll and a second carrier provided on the other of said sections and arranged to carry the other end portion of a roll, said first carriers being aligned with the respective second carriers, each of said carriers including a substantially U-shaped cradle having a first leg mounted in the respective section for rotation about a second axis which is parallel to said substantially horizontal axis and a second leg having a socket for one end portion of a roll, said sockets having open upper sides and said second axes coinciding with the axes of rolls the end portions of which extend into the respective sockets.

2. The magazine of claim 1, wherein said first carriers and said second carriers are equidistant from each other in the circumferential direction of the respective sections, and further comprising common drive means for rotating said sections about said axis.

3. The magazine of claim 1, further comprising guide means for preventing changes of orientation of said cradles while said rotor turns about said predetermined axis.

4. The magazine of claim 3, wherein said guide means comprises annular guides adjacent said sections and followers provided on said cradles and tracking the respective annular guides.

5. The magazine of claim 4, wherein said followers include levers which are coplanar with the legs of the respective cradles and said annular guides are disposed in planes extending at right angles to said predetermined axis, said frame including stops arranged to maintain said annular guides in predetermined positions in which the axes of said guides are offset from said predetermined axis by distances corresponding to the length of one of said levers.

6. The magazine of claim 5, wherein said predetermined axis is horizontal and the axes of said annular guides are disposed at a level above said predetermined axis.

7. The magazine of claim 1, wherein the end portions of calender rolls are rotatable in the respective sockets, and further comprising means for rotating the rolls which are supported by said cradles in response to rotation of said rotor.

8. The magazine of claim 7, wherein said means for rotating includes a stationary friction wheel provided on said frame and engaging the rolls which are supported by said cradles.

9. A magazine for temporary storage of calender rolls of the type having first and second end portions, comprising a frame; a rotor in said frame, said rotor having means for supporting a plurality of calender rolls and being mounted in said frame for rotation about a predetermined axis, said supporting means including a plurality of supports for discrete calender rolls and said supports being arranged to orbit about said axis in response to rotation of said rotor, said rotor including two sections which are spaced apart from each other in the direction of said axis and each of said supports including a first carrier provided on one of said sections and arranged to carry one end portion of a roll and a second carrier provided on the other of said sections and arranged to carry the other end portion of a roll, said first carriers being aligned with the respective second carriers, each of said carriers including a substantially U-shaped cradle having a first leg mounted in the respective section for rotation about a second axis which is parallel to said predetermined axis and a second leg having a socket for one end portion of a roll, the end portions of calender rolls being rotatable in the respective sockets; and means for rotating the rolls which are supported by said cradles in response to rotation of said rotor.

10. The magazine of claim 9, wherein said friction wheel includes a plurality of sections which are inflatable and deflatable independently of each other.

11. The magazine of claim 1, wherein each of said sockets is bifurcated.

* * * * *